United States Patent
Maaseidvaag et al.

(10) Patent No.: US 6,167,696 B1
(45) Date of Patent: Jan. 2, 2001

(54) EXHAUST GAS PURIFICATION SYSTEM FOR LOW EMISSION VEHICLE

(75) Inventors: Frode Maaseidvaag, Ann Arbor; Jeffrey Scott Hepburn, Dearborn, both of MI (US)

(73) Assignee: Ford Motor Company, Dearborn, MI (US)

( * ) Notice: Under 35 U.S.C. 154(b), the term of this patent shall be extended for 0 days.

(21) Appl. No.: 09/325,655

(22) Filed: Jun. 4, 1999

(51) Int. Cl.$^7$ ..................................................... F01N 3/00
(52) U.S. Cl. .................. 60/274; 60/285; 60/295; 60/300; 60/301; 60/311
(58) Field of Search ............................. 60/274, 285, 295, 60/297, 300, 301, 302, 311; 423/212 R; 55/DIG. 30

(56) References Cited

U.S. PATENT DOCUMENTS

| | | | |
|---|---|---|---|
| 5,255,511 | * 10/1993 | Maus et al. | 60/274 |
| 5,260,035 | * 11/1993 | Lachman et al. | 55/DIG. 30 |
| 5,467,594 | 11/1995 | Aoki et al. . | |
| 5,499,501 | 3/1996 | Kato et al. . | |
| 5,501,073 | * 3/1996 | Miyashita et al. | 60/285 |
| 5,544,482 | 8/1996 | Matsumoto et al. . | |
| 5,555,724 | 9/1996 | Hatcho et al. . | |
| 5,584,177 | 12/1996 | Oketani et al. . | |
| 5,600,949 | * 2/1997 | Kato et al. | 60/300 |
| 5,634,331 | 6/1997 | Aoki et al. . | |
| 5,649,421 | 7/1997 | Wakabayashi et al. . | |
| 5,655,362 | 8/1997 | Kawajiri et al. . | |
| 5,713,198 | 2/1998 | Aoki et al. . | |
| 5,746,989 | * 5/1998 | Murachi et al. | 423/212 R |
| 5,802,845 | * 9/1998 | Abe et al. | 60/297 |
| 5,979,157 | * 11/1999 | Kinugasa et al. | 60/274 |
| 6,029,441 | * 2/2000 | Mizuno et al. | 60/300 |
| 6,058,700 | * 5/2000 | Yamashita et al. | 60/285 |

* cited by examiner

*Primary Examiner*—Thomas Denion
*Assistant Examiner*—Tu M. Nguyen
(74) *Attorney, Agent, or Firm*—Jerome R. Drouillard

(57) ABSTRACT

An exhaust gas purification system for a lean burn internal combustion engine including a three-way catalyst, a hydrocarbon trap downstream of the three-way catalyst, a $NO_x$ trap downstream of the hydrocarbon trap, and an electrically heated catalyst located between the hydrocarbon trap and $NO_x$ trap. In one embodiment, the $NO_x$ trap includes an integral particulate filter having alternating blocked channels extending longitudinally. The inlet channels filter particulate matter and the outlet channels have a $NO_x$ absorbent wash coat for absorbing exhaust gas $NO_x$. A method of controlling the exhaust system during cold start engine operation is provided to reduce cold start emissions. The method further includes a control procedure for activating the electrically heated catalyst for desulfation and particulate matter burn-off.

6 Claims, 6 Drawing Sheets

EXHAUST GAS PURIFICATION SYSTEM FOR LOW EMISSION VEHICLE

FIELD OF THE INVENTION

The present invention relates generally to exhaust systems for vehicles and, more particularly, to an exhaust after-treatment system for a low emission, lean-burn vehicle.

BACKGROUND OF THE INVENTION

Three-way catalysts are generally used as a means for removing pollutants from the exhaust gas of an internal combustion engine. These three-way catalysts remove CO, HC, and $NO_x$ simultaneously from engine exhaust gases when the air-fuel ratio of the exhaust gas is at a stoichiometric air-fuel ratio. The ability of a three-way catalyst to remove $NO_x$ in the exhaust gas falls rapidly, however, when the air-fuel ratio of the exhaust gas becomes leaner. Therefore, in engines operating in a lean air-fuel ratio environment, such as stratified charge lean-burn engine, it is difficult to remove $NO_x$ from the exhaust gas using a conventional three-way catalyst.

Accordingly, to achieve $NO_x$ control, exhaust after-treatment systems have included a $NO_x$ trap. Presently, however, the performance of $NO_x$ trap technology is limited in several respects. $NO_x$ trap performance is affected by the operating temperature, and requires a relatively narrow temperature operating window. In addition, sulfur poisoning degrades the performance efficiency of $NO_x$ traps, and typical gasoline can contain high sulfur levels.

Governmental regulations of emissions are also becoming more stringent. Because the efficiency of three-way catalysts and $NO_x$ traps are temperature dependent, a significant portion of harmful emissions are generated during the cold start portion of the engine cycle, i.e., the first 100–200 seconds after cold start. Thus, there exists a need for an exhaust after-treatment system which provides an effective means of reducing cold start, HC, and $NO_x$ emissions.

SUMMARY OF THE INVENTION

One object of the present invention is to provide an improved exhaust gas purification system.

The foregoing and other objects and advantages are achieved through the provision of an exhaust gas purification system for a lean burn internal combustion engine including a three-way catalyst, a hydrocarbon trap downstream of the three-way catalyst, a $NO_x$ trap downstream of the hydrocarbon trap, and an electrically heated catalyst located between the hydrocarbon trap and $NO_x$ trap. In one embodiment, the $NO_x$ trap includes an integral particulate filter having alternating blocked channels extending longitudinally. The inlet channels filter particulate matter and the outlet channels have a $NO_x$ absorbent wash coat for absorbing exhaust gas $NO_x$.

A method of controlling the exhaust system is also provided. The disclosed method of purifying exhaust gas further includes a procedure for activating the electrically heated catalyst for $NO_x$ trap desulfation and particulate matter removal.

One advantage of the present invention is that it reduces the problems associated with $NO_x$ trap sulfur poisoning. Another advantage is that it reduces the limitations caused by the temperature operating window of the $NO_x$ trap. A further feature of the invention is improved reductions in tail pipe, HC, and $NO_x$ generated during engine cold start.

Other features and advantages of the invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DESCRIPTION OF THE PREFERRED EMBODIMENTS

Figure 1:
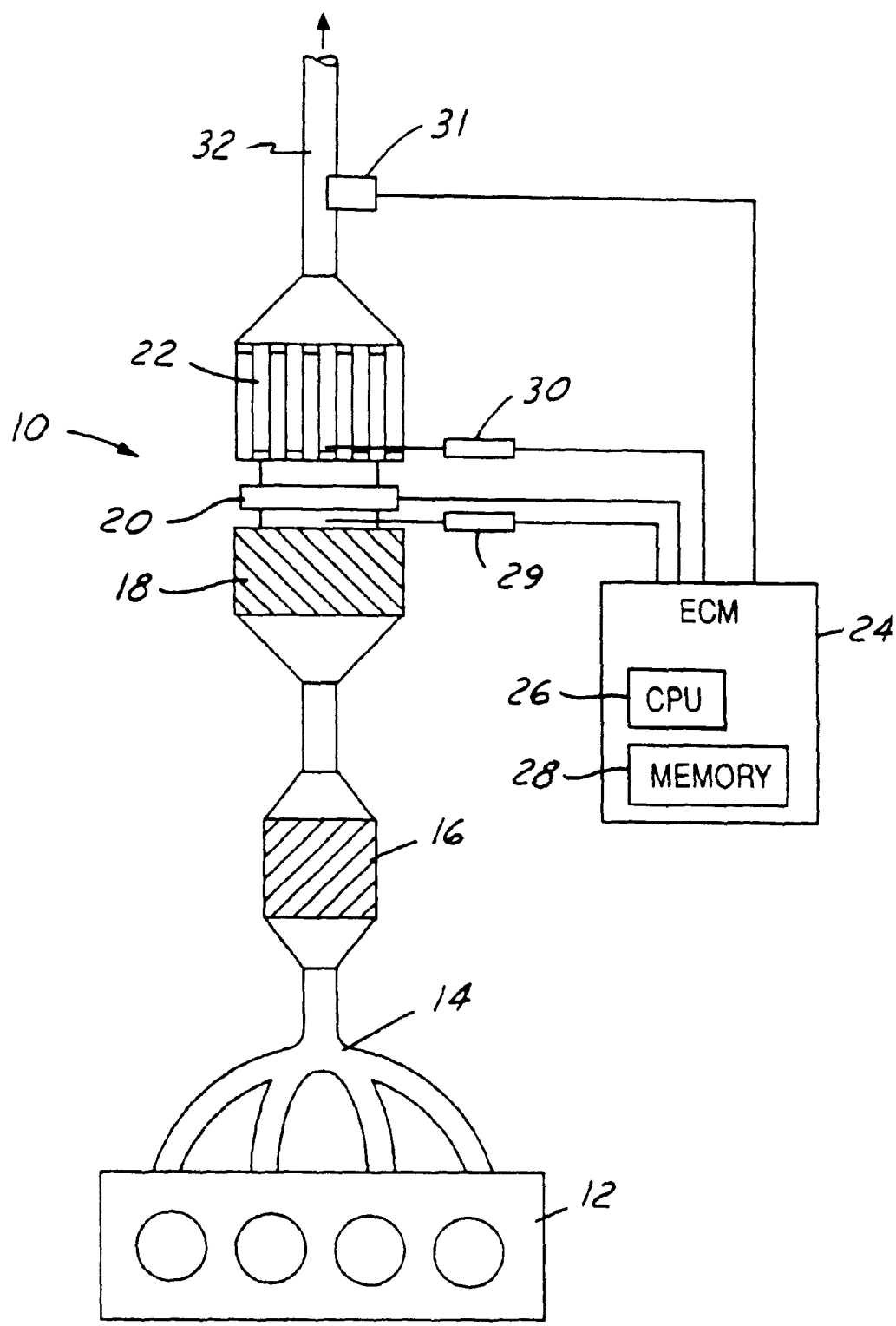
FIG. 1 is a plan view of an exhaust system according to one embodiment of the present invention illustrating its operational relationship with an internal combustion engine.

Turning now to FIG. 1, an exhaust system 10 is illustrated in operational relationship with an internal combustion engine 12 such as a direct injected stratified charge lean-burn engine for an automotive vehicle. The engine 12 has an exhaust manifold 14 to direct the exhaust gases from the engine 12 to the exhaust system 10. Closely coupled to the exhaust manifold is a three-way catalyst 16 such as a conventional precious metal oxidation catalyst. The three-way catalyst 16 functions to oxidize the majority of the HC and CO as well as a portion of the $NO_x$ in the exhaust flow once the temperature of the three-way catalyst 16 reaches its operational range. The exhaust system 10 further includes a HC trap 18 located downstream of the closely coupled three-way catalyst 16. During cold starting of the engine 12, before the closely coupled three-way catalyst 16 reaches its operational temperature, HC emissions from the engine 12 are captured by the HC trap 18. Downstream from the HC trap 18 is an electrically heated catalyst (EHC) 20 and a $NO_x$ trap 22. Preferably, $NO_x$ trap 22 is an integral $NO_x$ trap and particulate matter filter capable of absorbing exhaust gas $NO_x$ and filtering particulate matter emissions.

The EHC 20 consists of a metal foil or powdered metal monolithic structure. Electrical current is applied to the walls of the structure thereby producing resistive heating. A catalytic washcoat may be applied to the walls of the metallic monolith.

The HC trap 18 consists of a monolithic substrate which is either metallic or ceramic. The substrate includes a washcoat consisting of a suitable high-temperature stable HC absorbent such as a zeolite. The washcoat can alternatively consist of a combination of HC absorbent and three-way catalyst material.

The functioning of the HC trap 18, EHC 20, and $NO_x$ trap 22 is controlled and monitored by the engine control module (ECM) 24. Logic control of the exhaust system 10 is carried out in the ECM 24 by way of a central processing unit (CPU) 26 such as a microprocessor and associated memory 28. Temperature sensors 29, 30 provide feedback to the ECM 24 regarding exhaust gas temperatures upstream and downstream of the EHC 20. Similarly, the heated exhaust gas oxygen sensor (HEGO) 31 provides feedback data to the ECM 24 regarding the exhaust gas oxygen concentration in the tail pipe 32.

The ECM 24 functions to limit emissions output in the following manner. During cold starting of the engine, before the closely coupled three-way catalyst 16 is operating efficiently, HC emissions from the engine 12 are captured by the HC trap 18. At the same time, power is supplied to the EHC 20 thereby activating the $NO_x$ trap 22. During this time, the engine is operating in a lean fuel mode, i.e., with an air-fuel ratio of approximately 16 to 17. This allows the close coupled three-way catalyst 16 to rapidly reach its effective operating temperature, and provides an oxygen rich environment which improves the absorption efficiency of the $NO_x$ trap 22.

Once the closely coupled three-way catalyst 16 is activated, the stored HCs are released from the HC trap 18 and oxidized by the downstream $NO_x$ trap 22, which is already operating as an efficient HC oxidation catalyst. The quantity of HC absorbed by the HC trap is monitored by measuring the exothermic temperature rise generated within the $NO_x$ trap 22 during the desorption process. Upon release of the stored HCs from the HC trap 18, the $NO_x$ trap 22 is regenerated by providing a brief, rich fuel environment to reduce stored $NO_x$ prior to exiting the cold start operating mode.

After the cold start operating mode, the exhaust system 10 is controlled by the ECM 24 operating in the warm engine operating mode. During normal engine operation, the ECM controls the air-fuel ratio based upon the engine speed, load, vehicle speed, and acceleration rate, among other things, as is known in the art. During stratified lean operation, however, the exhaust gas temperatures can become very low. As a result, the $NO_x$ trap absorption efficiency can degrade. For this reason, the temperature of the $NO_x$ trap 22 is continuously monitored by the ECM 24 by way of temperature sensor 30. When the $NO_x$ trap temperature falls below a critical value, power is supplied to the EHC 20 to raise the $NO_x$ trap temperature to an acceptable level.

The sulfur level in the $NO_x$ trap 22 is also continuously monitored. When the $NO_x$ trap absorption efficiency falls below a critical level due to the accumulation of sulfur, the ECM 24 initiates a $NO_x$ trap desulfation event. During such time, the engine air-fuel ratio is operated at a rich set point, and the EHC 20 is again activated. Electrical current to the EHC 20 is regulated as a function of the exhaust gas flow rate and the difference between the desired $NO_x$ trap desulfation temperature and the EHC inlet temperature as indicated by temperature sensor 29. The desired $NO_x$ trap desulfation temperature is the temperature at which desulfation takes place.

Figure 2A:
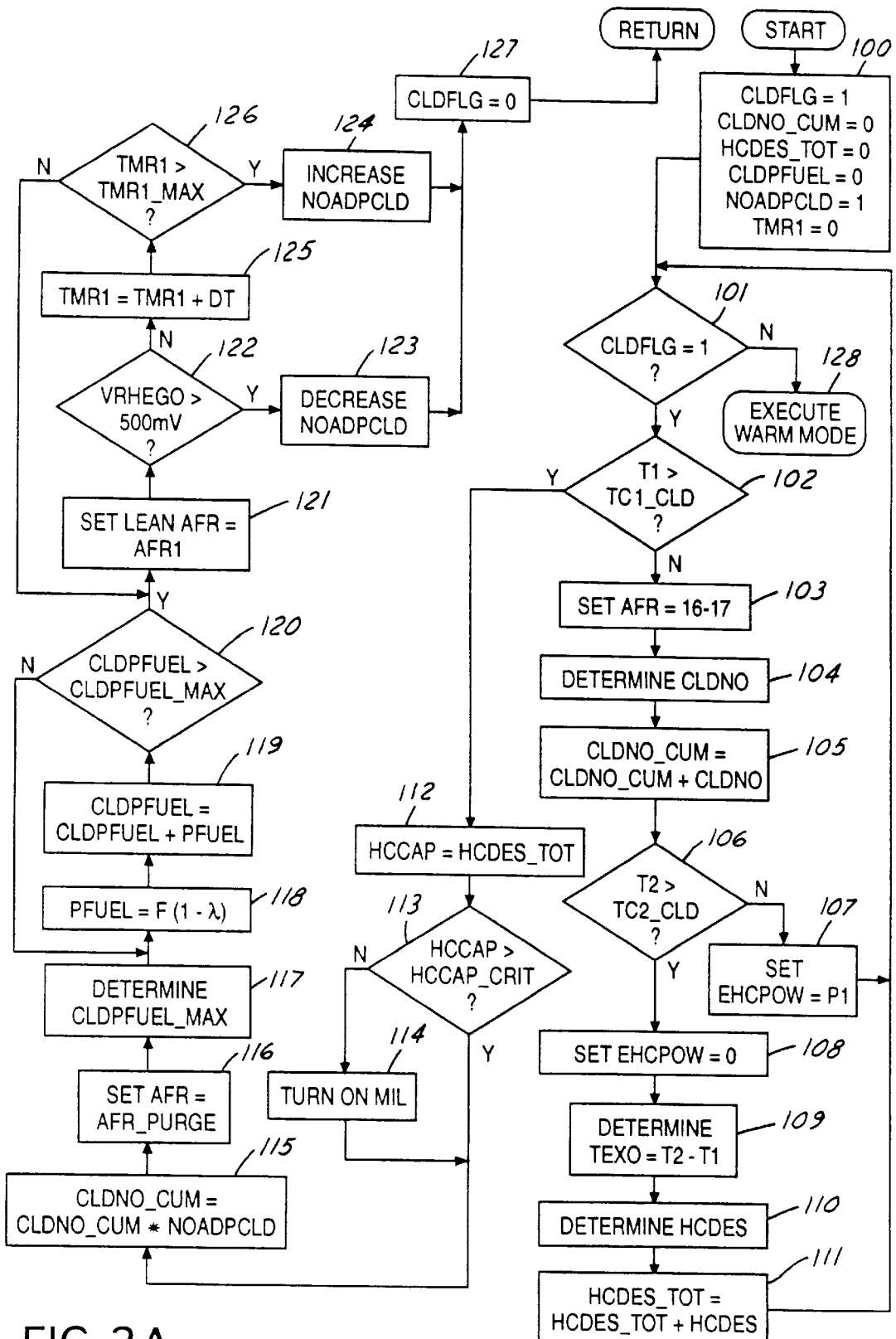
FIGS. 2A and 2B are one embodiment of a logic control diagram for the exhaust system shown in FIG. 1.

The preferred logic routines executed by the ECM 24 to control the exhaust gas purification system 10 will now be described with reference to FIGS. 2A and 2B. FIG. 2A represents a control algorithm for operation of the exhaust gas purification system 10 during cold start operation of the engine 12. At the start of the engine 12, cold start operating values are initialized at block 100. Thus, the cold start operating mode is indicated (CLDFLG=1); the variable representing the total mass of feed gas $NO_x$ absorbed during cold start is zeroed (CLDNO_CUM=0); the total mass of desorbing HCs is set to 0 (HCDES_TOT=0); the $NO_x$ trap purge fuel is turned off (CLDPFUEL=0;, an adaptive correction factor for cold mode operation of the $NO_x$ accumulator is activated (NOADPCLD=1); and the $NO_x$ trap purge timer is initialized (TMR1=0).

The cold start operating mode is checked at decision block 101. The cold start operating mode is maintained as long as the inlet temperature to the EHC 20 as measured by temperature sensor 29 remains below a predetermined temperature (TC1_CLD). This is determined at decision block 102. If the engine is operating below the critical temperature, the air-fuel ratio is set lean (block 103), the mass of feed gas $NO_x$ is determined (block 104), and this value is added to the cumulative total (block 105). Similarly, the outlet temperature of the EHC 20 is compared against a critical value at decision block 106. If the critical temperature has not been achieved, then power is supplied to the EHC 20 at block 107. Otherwise, the power is turned off (block 108), and the exothermic temperature rise due to desorbing HCs is determined (block 109) as a function of the differential temperature across the EHC 20. This value allows the mass of desorbing HCs to be determined at block 110 and added to the cumulative total of desorbed HCs for the cold start operating at block 111.

Referring again to decision block 102, once the critical temperature has been reached indicating that the engine is no longer operating in cold start mode, the value representing the accumulated HCs are stored (block 112) and compared against a critical value representing the HC absorption capacity (block 113). If the critical HC absorption capacity has been exceeded during cold start operation, the logic routine continues, otherwise a malfunction indicator light is activated in compliance with on-board emission standards at block 114. The total mass of feed gas $NO_x$ absorbed during cold start operation is adjusted by the adaptive correction factor for cold mode $NO_x$ accumulation at block 115.

Once the HCs have been desorbed and oxidized, the stored $NO_x$ within the $NO_x$ trap 22 is reduced by setting a rich air-fuel ratio. The excess fuel (PFUEL) is determined as a function of the estimated amount of stored $NO_x$ (CLDNOX_CUM). The corresponding signal from the downstream HEGO sensor 31 (VRHEGO) is used to adjust an adaptive correction factor (NOADPLCD) for the cold start $NO_x$ accumulator model.

Before leaving the cold start mode, the $NO_x$ trap is regenerated by providing a brief interval of rich fuel environment. Accordingly, the air-fuel ratio is adjusted to a purge value (block 116), and the maximum $NO_x$ trap purge fuel amount for cold start operating mode is determined (block 117). A rich fuel environment is then created in the exhaust system 10 (block 118), and a total fuel delivered is monitored (block 119) and compared against a maximum value (block 120). After the burst of rich engine operation, the air-fuel ratio is again set lean (block 121). The voltage on the HEGO sensor 31 is monitored at decision block 122. The adaptive correction factor for cold mode operation of the $NO_x$ accumulator is adjusted accordingly (blocks 123, 124) as a function of the HEGO sensor feedback and $NO_x$ trap purge timer (blocks 125, 126). This is done to correct for errors in the $NO_x$ accumulator model and, thereby, more accurately determine the amount of excess fuel required for purging. Finally, the cold start operating mode is terminated (block 127) and the logic continues to the warm engine operating mode (block 128).

Figure 2B:
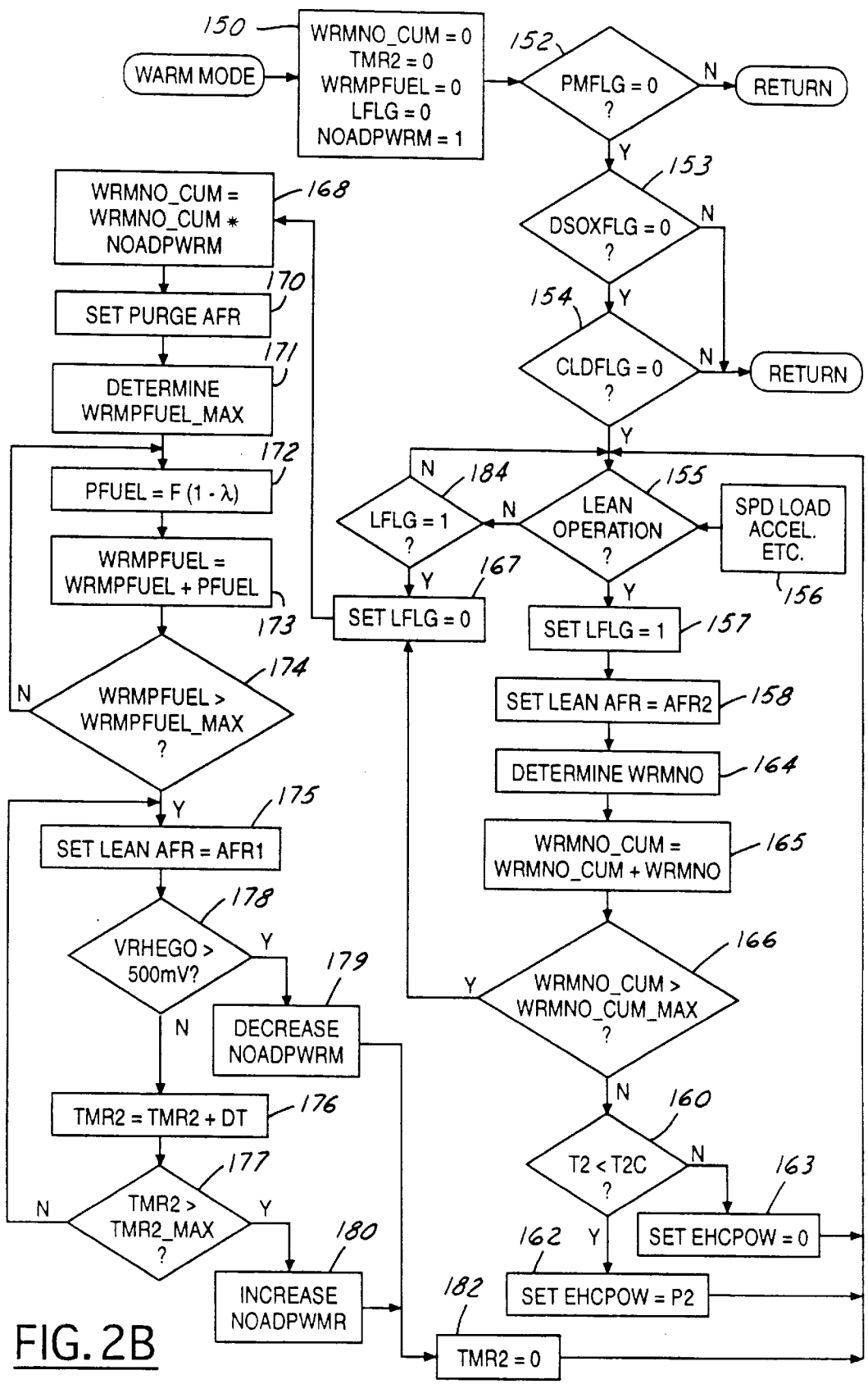

FIG. 2B represents the logic control executed by the ECM 24 during warm engine operating mode. The warm operating mode control algorithm begins with a series of initializations (block 150). Thus, the total $NO_x$ absorbed during warm mode operation is zeroed (WRMNO_CUM=0), the $NO_x$ trap purge timer is zeroed (TMR2=0), the $NO_x$ trap purge fuel for the warm mode is turned off (WRMPFUEL=0), the flag indicating lean-burn mode is initialized (LFLG=0), and the adaptive correction factor for the warm mode $NO_x$ accumulator is initialized (NOADPWRM=1). The logic then determines whether the particulate matter filter is being regenerated (block 152), $NO_x$ trap desulfation is being executed (block 153), or the engine is in cold start operating mode (block 154). If any of these conditions are satisfied, the routine exits to the main program (FIG. 2B).

Within the warmed-up engine operating mode, lean-burn operation (block 155) is entered based upon the engine speed, load, vehicle speed, acceleration rate, etc., as is known in the art (block 156). During stratified lean operation (blocks 157, 158), the exhaust gas temperatures can become very low thereby degrading the $NO_x$ trap performance. For this reason, the $NO_x$ trap temperature is continuously monitored (block 160), and if the $NO_x$ trap temperature falls below a critical value, electrical power to the EHC 20 is applied (block 162) to raise the $NO_x$ trap temperature to an appropriate level. Otherwise, no power is supplied to the EHC 20 (block 163).

At the same time, during lean operation in the warm engine operating mode, the mass of feed gas $NO_x$ is determined (block 164), a running total is kept (block 165), and compared to the maximum absorption value for the $NO_x$ trap (block 166). When the maximum absorption value is exceeded, the lean-burn flag is cleared (block 167) and the $NO_x$ trap is purged.

To purge the $NO_x$ trap, the accumulated total $NO_x$ during warm mode is adjusted by the adaptive correction factor for the warm mode $NO_x$ accumulator (block 168), and the air-fuel ratio is set to the purge level (block 170). Separate adaptive correction factors are used for the cold and warm operating modes to better account for the vastly different engine and $NO_x$ trap operating conditions which exist in cold and warm mode. The maximum $NO_x$ trap purge fuel amount for warm mode is determined (block 171), and fuel is incrementally delivered (blocks 172, 173) until the maximum fuel value is achieved (block 174). Thereafter, the air-fuel ratio is adjusted towards lean (block 175). This continues for a predetermined period of time (blocks 176, 177), or until the HEGO sensor 31 has reached a critical value (block 178). As shown in FIG. 2B, the adaptive correction factor for the warm mode $NO_x$ accumulator is adjusted accordingly (blocks 179, 180). Once the $NO_x$ trap has been purged, the $NO_x$ trap purge timer for the warm mode is reset (block 182). The logic routine then returns to monitoring the engine operation and the lean-burn mode flag (blocks 155, 184).

Over time, the efficiency of the $NO_x$ trap deteriorates due to fuel-sulfur poisoning. When the efficiency of the $NO_x$ trap falls below a critical level, a $NO_x$ trap desulfation event is initiated (SOXREG).

Figure 3:
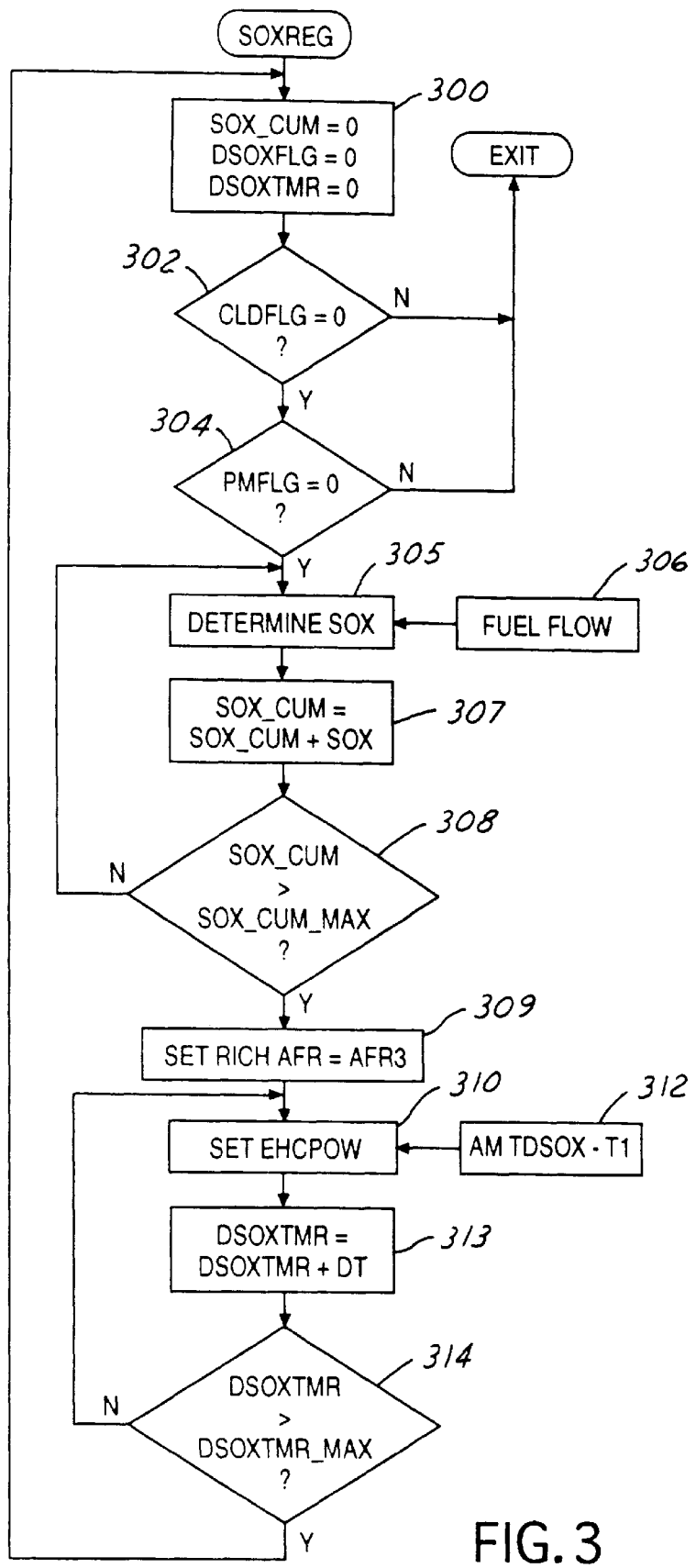
FIGS. 3 is a logic control diagram for the desulfation process for the $NO_x$ trap in the exhaust system of FIG. 1.

FIG. 3 shows the logic control routine executed by the ECM 24 during $NO_x$ trap desulfation. The logic routine begins with a series of initializations (block 300). The total $SO_x$ accumulated is zeroed ($SO_x\_CUM=0$), the $NO_x$ trap desulfation mode flag is cleared ($DSO_xFLG=0$), and the desulfation mode timer is zeroed ($DSO_xTMR=0$)

If the engine is operating in the cold start mode (block 302), or the particulate filter is being regenerated (block 304), the desulfation routine will not be executed. Otherwise, the logic continues by estimating the mass of feed gas $SO_x$ in the exhaust flow (block 305) as a function of the fuel flow (block 306). The total feed gas $SO_x$ (block 307) is then compared to a predetermined critical value (block 308). When the critical value is reached, the engine air-fuel ratio is switched to a rich set point (block 309) and power is applied to the EHC 20 (block 310). Electrical current to the EHC is regulated as a function of the exhaust gas flow rate and the difference between the desired $NO_x$ trap desulfation temperature and the EHC inlet temperature (block 312). The desulfation process is then continued for a predetermined period of time (blocks 313, 314).

During stratified lean-burn operation, engine particulate emissions can be very high due to incomplete fuel-air mixing. To control the level of particulate emissions in the exhaust system 10, the $NO_x$ trap 22 of FIG. 1 is preferably an integrated $NO_x$ trap particulate filter.

Figure 4:
FIG. 4 is a schematic diagram of one embodiment of the integrated $NO_x$ trap-particulate filter of the exhaust system of FIG. 1.

Referring to FIG. 4, there is shown a preferred embodiment for an integral $NO_x$ trap particulate filter for use in the exhaust system 10 of FIG. 1. As shown in FIG. 4, the filter 22 includes a filter substrate 40 extending longitudinally. Filter substrate 40 has a plurality of walls 42 extending longitudinally and forming a plurality of alternating first and second channels 44 and 46. The walls 42 are made of a ceramic material, such as ceramic cordierire. The ceramic material is porous and has a maximum pore size of approximately 60 microns. The walls 42 have a thickness of 20 to 25 mils. The walls 42 are configured to provide 50 to 60 channels per square inch. Channels 44, 46 have a generally rectangular cross-section, although it should be appreciated that the cross-sectional area of the channels 44, 46 is dictated by flow and filtering requirements.

Each of the channels 44, 46 have an inlet end 48 and an outlet end 50. The first channels 44 have a blocking member 52 to close the outlet end 50 and the second channels 46 have a blocking member 52 to close the inlet end 48. The blocking member 52 is made of a ceramic material such as ceramic cordierire. Second channels 46 also have a $NO_x$ absorbent wash coat 54 extending from the outlet end 50 along the walls 42 toward the inlet end 48. The wash coat 54 is a $NO_x$ absorbent applied by conventional procedures. The $NO_x$ absorbent is preferably a precious metal such as Pt—Rh and an alkali metal such as potassium or lithium or an alkaline earth metal such as barium or strontium dispersed into an alumina support deposited onto the walls 42 of the second channels 46.

It should be appreciated that alternate channels 44, 46 are blocked to force all of the exhaust gas flow through the walls 42 having the wash coat 54, thereby filtering the exhaust gas particulate matter and absorbing the $NO_x$. Exhaust gases from the engine 12 enter through the inlet openings 48, pass through the porous walls 42 of the substrate, and exit through the second channels 46 at the open outlets 50. Since the particulate matter is too large to pass through the pores within the substrate wall 42, it deposits onto the surface 55 of the open channels 44. The $NO_x$ passes readily through the substrate wall 42 and is stored as a nitrate complex. In addition, any remaining HC and CO is oxidized over the platinum within the $NO_x$ trap wash coat 54.

As particulate matter accumulates on the particulate filter, exhaust system back pressure will slowly increase, and a particulate filter will require regeneration. At this time, a particulate filter regeneration mode is entered (PMREG).

Figure 5:
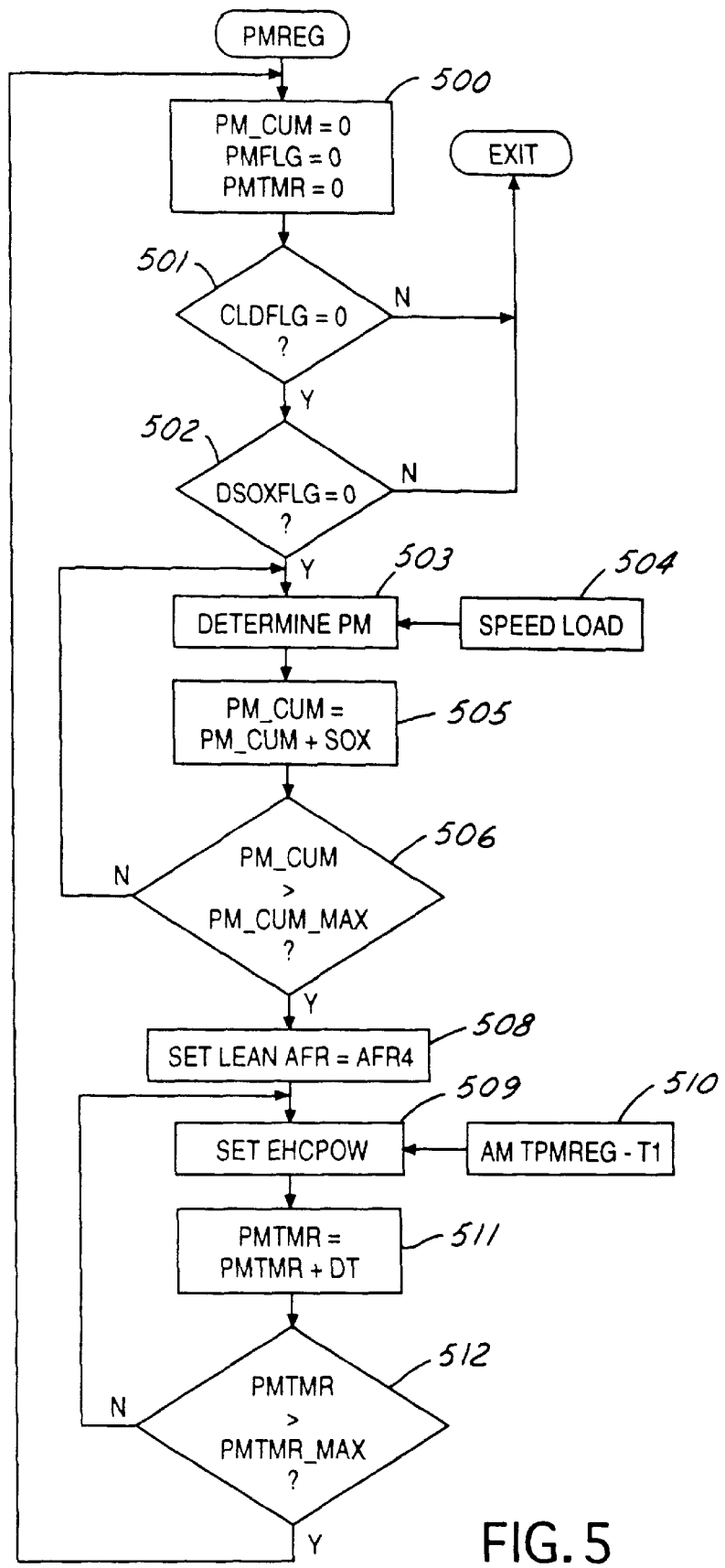
FIG. 5 is a logic control diagram for monitoring and removing particulate matter in the exhaust filter of FIG. 4.

FIG. 5 shows the logic control routine for one embodiment of the particulate filter regeneration mode. The logic begins with a series of initializations (block 500). The variable representing the accumulated particulate matter is cleared (PM_CUM=0), the particulate filter regeneration mode flag is cleared (PMFLG=0), and the particulate filter regeneration timer is zeroed (PMTMR=0). The logic then determines whether the engine is operating in cold start mode (block 501), or $NO_x$ trap desulfation is taking place (block 502). If either condition is true, the particulate filter regeneration mode is terminated. Otherwise, the mass of feed gas particulate matter is determined (block 503) as a function of the engine speed and load (block 504), and a running total (block 505) is compared against a maximum value (block 506).

Once the critical particulate matter value is reached, the engine air fuel ratio is set to a lean control point (block 508), and the temperature of the $NO_x$ trap particulate filter is increased to the desired regeneration temperature by supplying electrical power to the EHC (block 509). The electrical current supplied to the EHC is proportional to the exhaust gas flow rate, and the difference between the desired particulate filter regeneration temperature and the EHC inlet temperature (block 510). These temperture signals are provided by the temperature sensors 29, 30 of FIG. 1. The regeneration process is allowed to continue in this manner for a predetermined period of time (blocks 511, 512).

From the foregoing, it will be seen that there has been brought to the art a new and improved exhaust gas purification system which overcomes the drawbacks associated with $NO_x$ trap sulfur poisoning and cold start tail pipe emissions.

While the invention has been described with one or more embodiments, it will be understood that the invention is not limited to those embodiments. On the contrary, the invention covers all alternatives, modifications, and equivalents, as may be included within the spirit and scope of the appended claims.

What is claimed is:

1. An exhaust gas purification system for an internal combustion engine comprising:
    a hydrocarbon trap;
    an electrically heated catalyst located downstream of said hydrocarbon trap;
    an integrated $NO_x$ trap-particulate filter downstream of said electrically heated catalyst;
    first and second temperature sensors providing first and second temperature signals upstream and downstream of said electrically heated catalyst, respectively; and
    an engine control module including a central processing unit and associated memory, said central processing unit programmed to perform the following steps:
        monitor the level of accumulated particulate matter in said $NO_x$ trap-particulate filter;
        monitor the level of absorbed sulfur in said $NO_x$ trap-particulate filter; and
        if the total amount of particulate matter accumulated in said $NO_x$ trap-particulate filter exceeds a predetermined level, then operate the engine at a lean air-fuel setpoint, and activate said electrically heated catalyst for a first predetermined period of time, otherwise;
        if the total amount of sulfur absorbed in said $NO_x$ trap exceeds a predetermined level, then operate the engine at a rich air-fuel setpoint, and activate said electrically heated catalyst for a second predetermined period of time.

2. In an internal combustion engine having an exhaust gas purification system comprising a hydrocarbon trap, an electrically heated catalyst located downstream of said hydrocarbon trap, an integrated $NO_x$ trap-particulate filter downstream of said electrically heated catalyst, first and second temperature sensors providing first and second temperature signals upstream and downstream of said electrically heated catalyst, respectively, and an engine control module including a central processing unit and associated memory, a method of purifying exhaust gas comprising the steps of:
    monitoring the level of accumulated particulate matter in said $NO_x$ trap-particulate filter;
    monitoring the level of absorbed sulfur in said $NO_x$ trap-particulate filter; and
    if the total amount of particulate matter accumulated in said $NO_x$ trap-particulate filter exceeds a predetermined level, then operating the engine at a lean air-fuel setpoint, and activating said electrically heated catalyst for a first predetermined period of time, otherwise;
    if the total amount of sulfur absorbed in said $NO_x$ trap exceeds a predetermined level, then operating the engine at a rich air-fuel setpoint, and activating said electrically heated catalyst for a second predetermined period of time.

3. The method of purifying exhaust gas as set forth in claim 2 wherein the step of monitoring the level of absorbed sulfur in said $NO_x$ trap-particulate filter includes the step of monitoring the level of absorbed sulfur stored in said $NO_x$ trap-particulate filter as a function of the engine fuel flow.

4. The method of purifying exhaust gas as set forth in claim 2 wherein the step of activating said electrically heated catalyst for a first predetermined period of time includes activating said electrically heated catalyst as a function of the exhaust gas flow rate and said first and second temperature signals.

5. The method of purifying exhaust gas as set forth in claim 2 wherein the step of monitoring the level of accumulated particulate matter in said $NO_x$ trap-particulate filter includes the step of monitoring the level of accumulated particulate matter in said $NO_x$ trap-particulate filter as a function of the engine speed and load.

6. The method of purifying exhaust gas as set forth in claim 2 wherein the step of activating said electrically heated catalyst for a second predetermined period of time includes activating said electrically heated catalyst as a function of the exhaust gas flow rate and as a function of the exhaust gas flow rate and said first and second temperature signals.

* * * * *